United States Patent [19]

Eppinger

[11] Patent Number: 4,934,263
[45] Date of Patent: Jun. 19, 1990

[54] ROTARY INDEXING MECHANISM FOR A SCREEN PRINTING MACHINE

[76] Inventor: Otto R. Eppinger, 41 Sixth Street, Parkdale, 3194, Victoria, Australia

[21] Appl. No.: 344,282
[22] PCT Filed: Jul. 1, 1988
[86] PCT No.: PCT/AU88/00232
  § 371 Date: Apr. 10, 1989
  § 102(e) Date: Apr. 10, 1989
[87] PCT Pub. No.: WO89/00257
  PCT Pub. Date: Jan. 12, 1989

[30] Foreign Application Priority Data
  Jul. 1, 1987 [AU] Australia ............... PI 2834/87

[51] Int. Cl.$^5$ ............... F16H 19/04; F16H 27/02; B23Q 16/06; B41F 15/14
[52] U.S. Cl. ............... 101/115; 198/345.2
[58] Field of Search ............... 101/115, 126; 198/345

[56] References Cited
U.S. PATENT DOCUMENTS
4,099,460 7/1978 Bubley et al. ............... 101/126 X
4,669,378 6/1987 Lee ............... 101/126 X

*Primary Examiner*—Clifford D. Crowder
*Attorney, Agent, or Firm*—Fleit, Jacobson, Cohn, Price, Holman & Stern

[57] ABSTRACT

A rotary indexing mechanism for a screen printing machine of the type comprising a carousel (10) which includes a multiple armed fixed frame (12) and a multiple armed movable frame (20) mounted to rotate relative thereto, a plurality of print heads mounted to one of the frames and a plurality of screen platens mounted to the other of the frames. The rotary indexing mechanism includes a coupling member (37) mounted for reciprocatory rotary motion, and including an engagement device (36) operable to engage the movable frame (20) during a selected portion of the reciprocatory rotary motion, a drive (40) including a linear actuator (40a, 40b, 40c) for effecting the reciprocatory rotary motion, a transmission mechanism (55) operatively connecting the drive (40) to the coupling member (37) and, a fluid damper (42) mounted so as to oppose the reciprocatory rotary motion of the coupling member (37). In one form the transmission includes two racks (60, 61) one connected to the drive (40) and the other connected to the fluid damper (42). In another form the transmission includes a crank (64) rotatable by the drive (40) with a pin (65) receivable in a slot (69) in the coupling member (37).

6 Claims, 3 Drawing Sheets

ROTARY INDEXING MECHANISM FOR A SCREEN PRINTING MACHINE

This invention relates to a rotary indexing mechanism which is particularly suitable for use with carousel devices such as screen printing carousels.

Screen printing carousels typically comprise a multiple armed fixed frame and a matching multiple armed movable frame mounted to rotate above or below the fixed frame. The print heads may be fixed and the screen platens movable or vice versa. It is particularly desirable that each indexed motion of the rotary frame come to a smooth stop substantially free of jarring and vibration. This objective can be theoretically met by suitably programmed control of an electric motor drive or linear motor system but it would be preferable to be able to employ a much less expensive and less complex hydraulic or pneumatic actuator. However, traditional rotary indexing mechanisms suitable for rams, e.g. crank based arrangements, are difficult to control to the extent desired.

Another problem of screen printing carousels of this type is owing to the potential danger to the operator resulting from the multiple armed movable frame. If the operator was within the sweep of these arms when they are operating there is a possibility that serious injury could be caused as result of the operator being struck by a moving arm.

It is accordingly an object of the invention in accordance with one aspect to provide a rotary indexing mechanism in which each indexed motion is brought to a smooth stop.

It is an object of the present invention in accordance with another aspect to provide an arrangement whereby the possibility of injury to an operator as a result of the moving arms is reduced.

According to one aspect of the present invention there is provided a rotary indexing mechanism for a screen printing machine, the machine comprising a carousel which includes a multiple armed fixed frame and a complementing multiple armed movable frame mounted to rotate above or below the fixed framed, a plurality of print heads mounted to one of either of the fixed frame or the movable frame and a plurality of screen platens mounted to the other of either the fixed frame or the movable frame the rotary indexing mechanism comprising a coupling member mounted for reciprocatory rotary motion, and including engagement means operable to engage the movable frame during a selected portion of said reciprocatory rotary motion, drive means which includes a linear actuator for effecting said reciprocatory rotary motion a transmission mechanism operatively connecting said drive means to said coupling member and, fluid damper means mounted so as to oppose said reciprocatory rotary motion of said coupling member at least in a terminal section of said selected portion of the motion in such a manner as to slow said motion to a smooth stop, characterized in that said transmission mechanism comprises a first linear rack operatively connected to said drive means, and pinion means engageable by said first rack said pinion means being operatively connected to said coupling member to cause said reciprocatory motion said transmission mechanism further including a second rack which is engageable with said pinion means and is operatively engageable with said fluid damper means said racks and pinion means being arranged so as to reduce or eliminate backlash.

In one form the pinion means comprises a first pinion which is adapted to engage with the first linear rack and a second pinion which is adapted to engage with the second linear rack the first and second pinions being mounted on a shaft which is common to both pinions.

In another form the pinion means comprises a single pinion mounted on a shaft with the first and second linear racks being adapted to engage that single pinion. Preferably the shaft extends generally parallel to the axis of rotation of the coupling member.

The transmission mechanism may comprise a crank which is rotatable by the drive means the crank including a pin receivable within a slot in the coupling member so as to be slidable therealong as the crank is rotated. The arrangement is such that the torque transmitted by the crank to the coupling member is at a minimum at a point intermediate the terminal sections of the selected portion of motion.

According to another aspect of the present invention there is provided a rotary indexing mechanism for a screen printing machine, the machine comprising carousel which includes a multiple armed fixed frame and a complementing multiple armed movable frame mounted to rotate above or below the fixed frame, a plurality of print heads mounted to one of either of the fixed frame or the movable frame and a plurality of screen platens mounted to the other of either the fixed frame of the movable frame, the rotary indexing mechanism comprising a coupling member mounted for reciprocatory rotary motion, and including engagement means operable to engage the movable frame during a selected portion of said reciprocatory rotary motion, drive means which includes a linear actuator for effecting said reciprocatory rotary motion, a transmission mechanism operatively connecting said drive means to said coupling member and fluid damper means mounted so as to oppose said reciprocatory rotary motion of said coupling member at least in a terminal section of said selected portion of the motion in such a manner as to slow said motion to a smooth stop, characterized in that said transmission mechanism comprises a crank which is rotatable by said drive means said crank including a pin receivable within a slot in said coupling member so as to be slidable therealong as said crank is rotated the arrangement being such that the torque transmitted by the crank to the coupling member is at a minimum at a point intermediate the terminal section of said selected portion of motion.

Preferably the fluid damper means is a sealed hydraulic damper, most conveniently of the piston and cylinder type. The drive means may typically by a pneumatic or hydraulic actuator. In an especially convenient arrangement, the hydraulic damper and pneumatic actuator are mounted substantially parallel and in proximity to each other with their respective cylinders extending parallel from respective hinged fixings.

Preferred embodiments of the invention will hereinafter be described with reference to the accompanying drawings and in those drawings.

Figure 1:
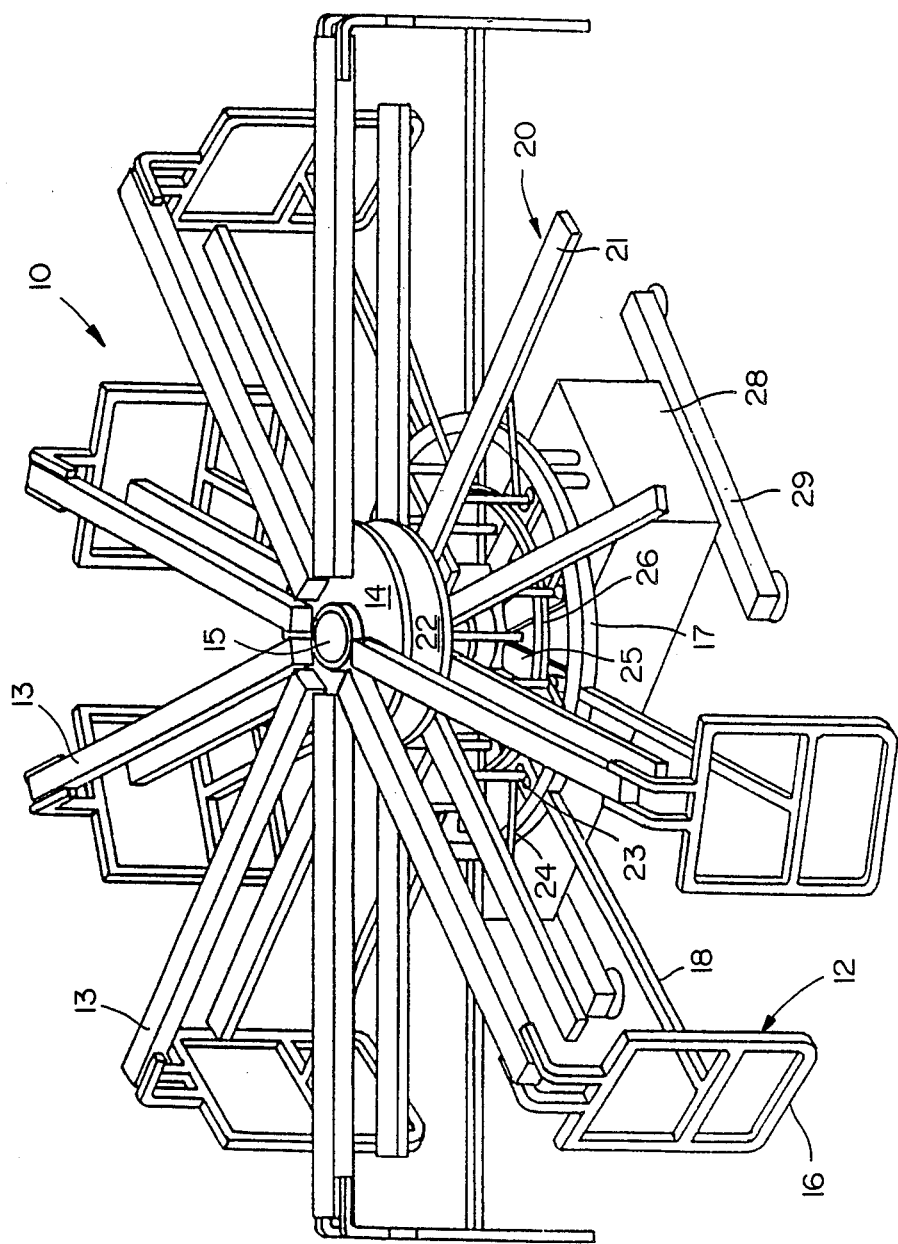
FIG. 1 is a perspective view of the principal frame elements of a screen printing carousel driven by a rotary indexing mechanism according to the present invention.

The screen printing carousel 10 illustrated in FIG. 1 includes a fixed frame 12 and a rotatable frame 20. Fixed frame 12 has multiple arms 13 that project radially from a central disk 14 which is secured to an upstanding post 15. At their outer ends, arms 13 may be supported on rectangular frame stands 16 which are themselves braced from a fixed angle-section ring 17 by respective radial struts 18.

The movable frame 20 likewise comprises of multiple radially projecting arms 21 fixed to a second disk 22 which forms part of a structure rotatable on post 15. Arms 21 extend in cantilever fashion and are braced by respective uprights 23 and adjustable diagonal struts 24 to underlying plates 25 which form a further part of the rotatable structure and are themselves rigidified by an inner angle-section ring 26.

Post 15 is supported on a broad pedestal box 28 that itself rests upon spaced elongate stabilising feet 29. In a complete installation, arms 13 carry respective print heads and the cantilever arms 21 support platens for the screens.

Box pedestal 28 may be arranged to house a rotary indexing mechanism in accordance with invention for rotating moving frame 20 about post 15. Arms 21 are equiangularly spaced by an angle equal to the angular spacing of arms 13. It will be seen that two of the arms 12 are missing and it is in this gap that the material or substrate to be printed is positioned on the printing screens on the cantilever arms and retrieved therefrom after having executed a complete circuit of the carousel. Each screen must stop at each station defined by the arms 12 and it is this step by step motion with which the mechanism in accordance with the invention is concerned. Means, not detailed herein, is of course provided for accurately locating and maintaining each indexed position.

Figure 2:
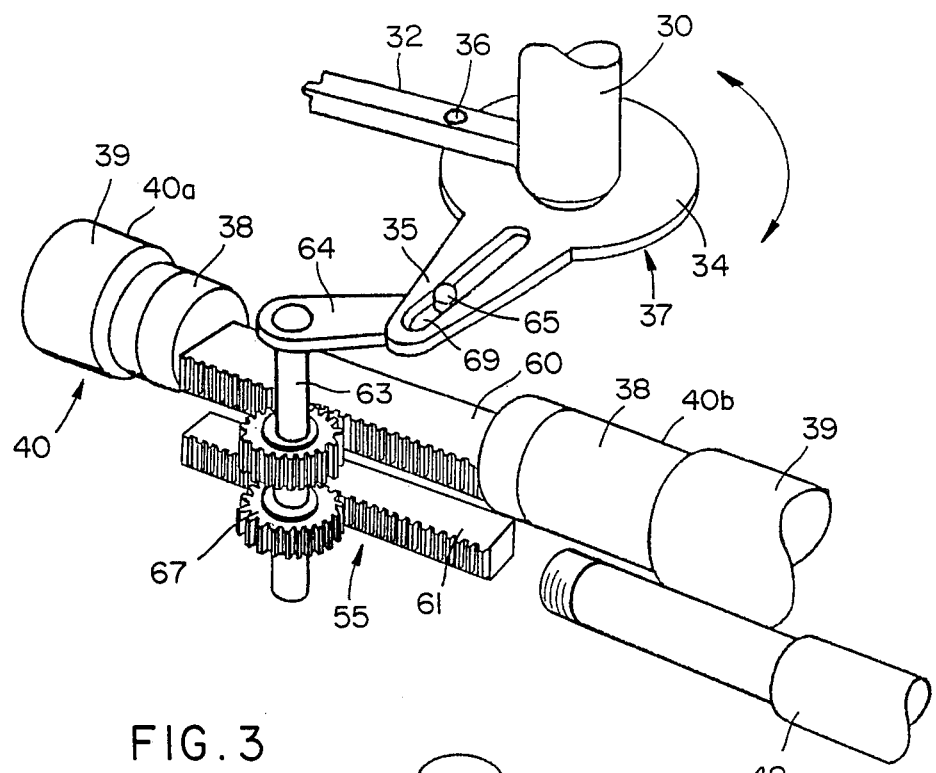
FIG. 2 is a schematic view of one form of rotary indexing mechanism according to the invention.
Figure 3:
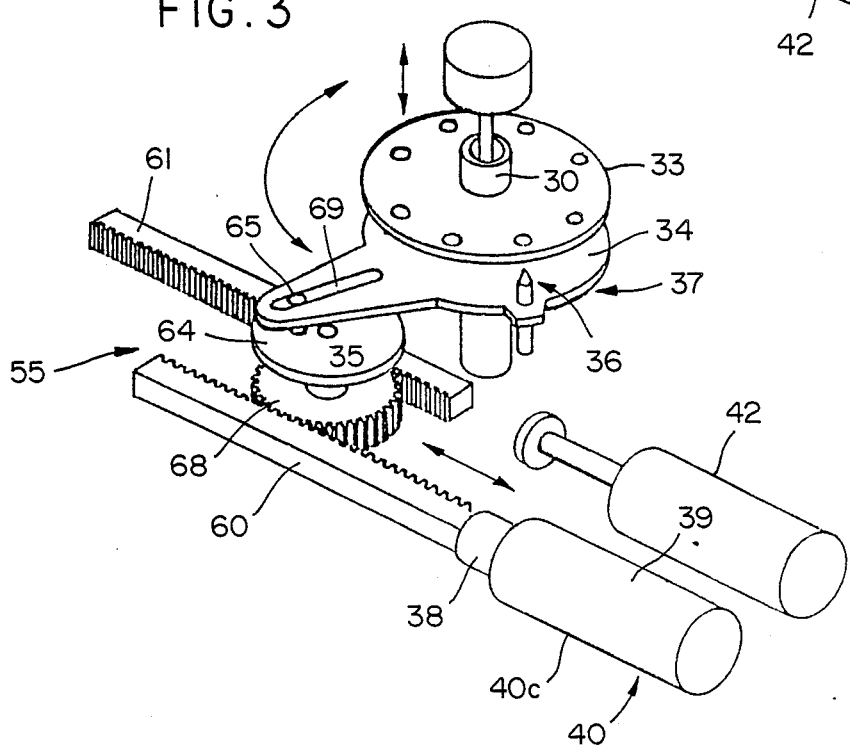
FIG. 3 is a schematic view of another form of indexing mechanism according to the present invention.

Two embodiments of rotary indexing mechanism according to the present invention are shown in FIGS. 2 and 3, and where possible like reference numerals have been used to describe like parts in those drawings. Conveniently the rotary indexing mechanism can be disposed within box pedestal 28 although it will be appreciated that it could be mounted elsewhere. The rotatable structure supporting frame 21 includes a sleeve 30 rotatably supported on the post 15. As shown in FIG. 2 a series of actuating arms 32 (only one is shown) project radially from this sleeve at angular intervals matching the indexing angle of the carousel. As shown in FIG. 3 arms 32 may be replaced by a disc 33 which forms part of or is operatively connected to the movable frame. Separately rotatably mounted on post 15 is a coupling element 37 in the form of a plate-like member 34. The plate-like member 34 carries means 36 for disengageably coupling the cross arm to a respective one of the actuating arm 32 or disc 33.

Drive means 40 is provided for driving the coupling element 37. In the embodiment of FIG. 2 the drive means 40 comprises a pair of single acting linear actuators 40a and 40b. In the embodiment of FIG. 3, the single acting actuators 40a and 40b are replaced by a double acting linear actuator 40c. Preferably the linear actuators are in the form of pneumatic actuators comprising pistons 38 and cylinders 39. A fluid damper in the form of an hydraulic damper 42 is also provided and the axes of the actuators and the dampers are substantially parallel. In the embodiment of FIG. 3 the axes of the actuators are preferably parallel however in the embodiment of FIG. 2 the axes could be angularly inclined.

Figure 4:
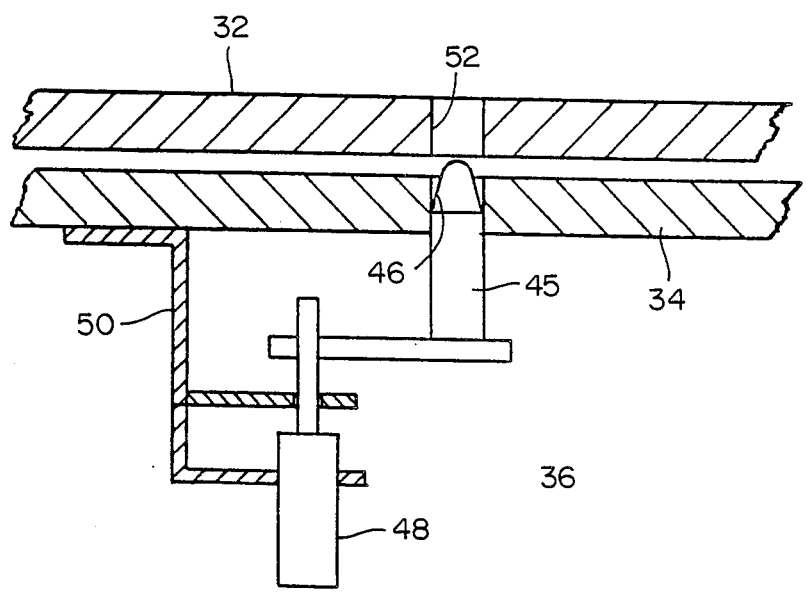
FIG. 4 is a sectional view showing a detail of a rotary mechanism according to the invention.

One example of engagement means 36 is detailed in FIG. 4. A pin 45 seated in a hole 46 in cross arm 34 is movable up and down by a small pneumatic actuator 48 secured with its axis vertical, to the underside of cross arm 34 by a bracket arrangement 50. In its raised position, pin 45 is able to engage a second hole 52 provided in each of the arms 32 or one of a series of circumferentially spaced holes in disc 33. The tip of the pin is tapered so that it will be driven down out of hole 52 in the presence of a predetermined degree of opposition to movement of the rotary frame 20, for example due to the presence of a person between the arms 21.

The frame 20 is indexed by raising the pin 45 to engage an overlying arm 32 or one of the holes in disc 33 and then causing the drive means 40 to move frame 20 an angular distance equal to the required angular indexation. The damper 42 is driven into its cylinder. As is apparent from the drawings the damper is arranged to offer little or no resistance to this motion until near the end of the indexing stroke, whereupon the fluid in the damper is arranged to offer substantial resistance to further movement and thereby to increasingly oppose the force of actuator. The arrangement is set such that as the actuator reaches the end of its stroke and is cut off, the damper 42 has brought the coupling element 37 and frame 20 to a smooth stop unaffected by the on-off behaviour of the pneumatic actuator, thereby substantially eleminating any sudden stop and consequent jarring and vibration.

The actuator 48 is now triggered to lower pin 45 and the drive means 40 operates to move cross arm 34 back to a starting position under the following arm 32 or following hole in disc 33, ready for the next indexing motion.

In the above described arrangement the pin 45 moves up and down to engage with the arms 32 as in FIG. 2 or the holes in the disc 33 as shown in FIG. 3. It will be appreciated however that in an alternative arrangement the disc or arms 33 and 32 may be movable up and down relative to the pin 45 to cause the engagement and disengagement.

A transmission mechanism 55 is provided for transferring power from the drive means 40 to the coupling element 37. Included in these mechanisms are features to substantially eliminate backlash and to reduce the hazzard which the rotary frame presents to operators standing within the carousel.

As shown, the plate like coupling element 34 carries the pin mechanism 36 at one section thereof and includes a laterally projecting leg 35 which is formed with an elongate slot 69 disposed radially with respect to the axis of the post. Whilst the slot 69 is shown as being straight it will be appreciated that it could be curved or some other configuration.

The drive means 40 is connected to the coupling element 37 by a transmission mechanism 55. In the embodiment of FIG. 2 the drive means 40 comprises two single acting linear actuators 40a and 40b and in this arrangement the transmission mechanism includes a linear rack 60 connected at opposite ends thereof to the piston rods (or extension thereof) of linear actuators 40a and 40b. Rack 60 engages a pinion 62 on an upright shaft 63. The transmission mechanism 55 further includes a crank 64 which is fixed to the shaft 63 and carries a pin 65 dimensioned to slide in a close fit along a slot 69 in leg 35 of coupling element 37. The arrangement is such that the mid-point of the indexing stroke occurs where the crank 64 and slot 69 are aligned radially with respect to post 15. The moment on the frame 20 is thereby at a minimum at the centre point of the indexing stroke and increases steadily to a maximum at the beginning and end of each stroke. The result is that sufficient force can be applied to properly institute the indexing stroke at reasonable speed and yet, when the cantilever arms are in the region of the centre of their motion, a person inadvertently standing between print stations will not be injured by the force of the cantilever arms and indeed would be capable of stopping the motion.

As shown, the piston of the hydraulic damper 32 is engageable with a second linear rack 61 in meshing engagement with a second pinion 67 on shaft 63. The provision of the actuators and damper with separate racks in this way is effective to substantially eliminate any backlash effects between the two devices.

In the embodiment shown in FIG. 3 the drive means 40 comprises a double acting linear actuator 40c and this is operatively connected to a rack 60 which is adapted to mesh with pinon 68 mounted on shaft 63. In this particular embodiment linear rack 61 also meshes with pinion 68 this second rack 61 being associated with damper 42.

I claim:

1. A rotary indexing mechanism for a screen printing machine, the machine comprising a carousel (10) which includes a multiple armed fixed frame (12) and a complementing multiple armed movable frame (20) mounted to rotate above or below the fixed frame (12), a plurality of print heads mounted to one of either of the fixed frame (12) or the movable frame (20) and a plurality of screen platens mounted to the other of either the fixed frame (12) or the movable frame (20) the rotary indexing mechanism comprising a coupling member (37) mounted for reciprocatory rotary motion, and including engagement means (36) operable to engage the movable frame (20) during a selected portion of said reciprocatory rotary motion, drive means (40) which includes a linear actuator (40a, 40b, 40c) for effecting said reciprocatory rotary motion, a transmission mechanism (55) operatively connecting said drive means (40) to said coupling member (37) and, fluid damper means (42) mounted so as to oppose said reciprocatory rotary motion of said coupling member (37) at least in a terminal section of said selected portion of the motion in such a manner as to slow said motion to a smooth stop, characterized in that said transmission mechanism (55) comprises a first linear rack (60) operatively connected to said drive means (40), and pinion means (68) engageable by said first rack (60) said pinion means (68) being operatively connected to said coupling member (37) to cause said reciprocatory motion said transmission mechanism further including a second rack (61) which is engageable with said pinion means (68) and is operatively engageable with said fluid damper means (42).

2. A rotary indexing mechanism according to claim 1 wherein said pinion means (68) comprising a first pinion (62) which is adapted to engage with said first linear rack (60) and a second pinion (67) which is adapted to engage with said second linear rack (61) said first and second pinions (62, 67) being mounted on a shaft (63) which is common to both said first and second pinions (62, 67).

3. A rotary indexing mechanism according to claim 1 wherein said pinion means (68) comprises a single pinion (69) mounted on a shaft (63) said first and second linear racks being adapted to engage said single pinion (69).

4. A rotary indexing mechanism according to claim 2 wherein said shaft (63) extends generally parallel to the axis of rotation of said coupling member (37).

5. A rotary indexing mechanism according to claim 1 wherein said transmission mechanism (55) comprises a crank (64) which is rotatable by said drive means (40) said crank (64) including a pin (65) receivable within a slot (69) in said coupling member (37) so as to be slidable therealong as said crank (64) is rotated the arrangement being such that the torque transmitted by the crank (64) to the coupling member (37) is at a minimum at a point intermediate the terminal section of said selected portion of motion.

6. A rotary indexing mechanism for a screen printing machine, the machine comprising carousel (10) which includes a multiple armed fixed frame (12) and a complementing multiple armed movable frame (20) mounted to rotate above or below the fixed frame (12), a plurality of print heads mounted to one of either of the fixed frame (12) or the movable frame (20) and a plurality of screen platens mounted to the other of either the fixed frame (12) or the movable frame (20), the rotary indexing mechanism comprising a coupling member (37) mounted for reciprocatory rotary motion, and including engagement means (36) operable to engage the movable frame (20) during a selected portion of said reciprocatory rotary motion, drive means (40) which includes a linear actuator (40a, 40b, 40c) for effecting said reciprocatory rotary motion, a transmission mechanism (55) operatively connecting said drive means (40) to said coupling member (37) and fluid damper means (42) mounted so as to oppose said reciprocatory rotary motion of said coupling member (37) at least in a terminal section of said selected portion of the motion in such a manner as to slow said motion to a smooth stop, characterized in that said transmission mechanism (55) comprises a crank (64) which is rotatable by said drive means (40) said crank (64) including a pin (65) receivable within a slot (69) in said coupling member (37) so as to be slidable therealong as said crank (64) is rotated the arrangement being such that the torque transmitted by the crank (64) to the coupling member (37) is at a minimum at a point intermediate the terminal section of said selected portion of motion.

* * * * *